United States Patent [19]

Shimoda et al.

[11] Patent Number: 5,216,712
[45] Date of Patent: Jun. 1, 1993

[54] RECORDING APPARATUS

[75] Inventors: Kenji Shimoda; Junko Kimura, both of Kanagawa, Japan

[73] Assignee: Kabushiki Kaisha Toshiba, Kanagawa, Japan

[21] Appl. No.: 812,823

[22] Filed: Dec. 24, 1991

[30] Foreign Application Priority Data

Dec. 27, 1990 [JP] Japan ..................... 2-418785

[51] Int. Cl.⁵ .......................................... H04N 7/167
[52] U.S. Cl. ......................................... 380/4; 380/3; 380/23; 360/60; 358/133
[58] Field of Search ................. 380/3, 4, 23, 14; 358/349, 135, 136, 133; 455/26.1; 364/725; 360/60; 369/48, 49

[56] References Cited

U.S. PATENT DOCUMENTS

| 4,631,603 | 12/1986 | Ryan ............................. 360/60 X |
| 4,835,682 | 5/1989 | Kurachi et al. ..................... 380/4 X |
| 4,908,862 | 3/1990 | Kaneko et al. .................. 358/135 X |
| 4,953,020 | 8/1990 | De With ........................... 358/133 |
| 4,982,282 | 1/1991 | Saito et al. ........................ 358/133 |
| 5,073,925 | 12/1991 | Nagata et al. ......................... 380/3 |

FOREIGN PATENT DOCUMENTS 2-124690 5/1990 Japan .

OTHER PUBLICATIONS

"New Recording Scheme of DAT", I. Shibazaki, May 1990, Magazine of Radio Technology; pp. 165-176.

Primary Examiner—Tod Swann
Attorney, Agent, or Firm—Finnegan, Henderson, Farabow, Garrett and Dunner

[57] ABSTRACT

A recording apparatus for recording a digital data, which includes an orthogonal transform unit for transforming the time axis of the digital data to the frequency axis on a block-by-block basis, a conversion circuit for converting the digital data from the orthogonal transform means to a digital recording data and a circuit for causing the conversion circuit to convert the digital data to a recording data which is substantially impossible to be restored to the original digital data.

9 Claims, 8 Drawing Sheets

| 100 | 80 | 70 | 60 |
| --- | --- | --- | --- |
| 80 | 70 | 60 | 50 |
| 70 | 60 | 50 | 40 |
| 60 | 50 | 40 | 30 |

| 1 | 2 | 3 | 4 |
| --- | --- | --- | --- |
| 2 | 3 | 4 | 5 |
| 3 | 4 | 5 | 6 |
| 4 | 5 | 6 | 7 |

|  |  |  |  |
|---|---|---|---|
| 50 | 20 | 11 | 7 |
| 20 | 11 | 7 | 5 |
| 11 | 7 | 5 | 3 |
| 7 | 5 | 3 | 2 |

Fig. 3C.

|  |  |  |  |
|---|---|---|---|
| 100 | 80 | * 66 | * 56 |
| 80 | * 66 | * 56 | 50 |
| * 66 | * 56 | 50 | * 36 |
| * 56 | 50 | * 36 | * 28 |

Fig. 3D.

| 40  | 80  | 120 | 160 |
|-----|-----|-----|-----|
| 80  | 120 | 160 | 200 |
| 120 | 160 | 200 | 240 |
| 160 | 200 | 240 | 280 |

*Fig. 5A.*

| 2 | 1 | 0 | 0 |
|---|---|---|---|
| 1 | 0 | 0 | 0 |
| 0 | 0 | 0 | 0 |
| 0 | 0 | 0 | 0 |

*Fig. 5B.*

| 0.2 | 0.4 | 0.6 | 0.8 |
|-----|-----|-----|-----|
| 0.4 | 0.6 | 0.8 | 1.0 |
| 0.6 | 0.8 | 1.0 | 1.2 |
| 0.8 | 1.0 | 1.2 | 1.4 |

*Fig. 6A.*

| 500 | 200 | 116 | 75 |
|-----|-----|-----|----|
| 200 | 116 | 75  | 50 |
| 116 | 75  | 50  | 33 |
| 75  | 50  | 33  | 21 |

*Fig. 6B.*

| 1 | 0 | 0 | 0 |
|---|---|---|---|
| 0 | 0 | 0 | 0 |
| 0 | 0 | 0 | 0 |
| 0 | 0 | 0 | 0 |

*Fig.8.*

| 1 | 2 | 6 | 7 |
|---|---|---|---|
| 3 | 5 | 8 | 13 |
| 4 | 9 | 12 | 14 |
| 10 | 11 | 15 | 16 |

*Fig.10A.*

| 16 | 14 | 13 | 7 |
|---|---|---|---|
| 15 | 2 | 8 | 6 |
| 11 | 9 | 5 | 2 |
| 10 | 4 | 3 | 1 |

*Fig.10B.*

RECORDING APPARATUS

FIELD OF THE INVENTION

The present invention relates generally to a recording apparatus, and more particularly, to a recording apparatus having a copy prohibiting function.

BACKGROUND OF THE INVENTION

As is well known, a standardization for high-efficiency encoding techniques of digital data has been enthusiastically promoted. At present there are three standards, i.e., (1) CCITT Recommendation H261 for video conference/video telephone., (2) JPEG (Joint Photograghic Expert Group) for still color pictures; and (3) MPEG (Moving Picture Expert Group) for a storage media such as a CD-ROM (Compact Disc Read Only Memory) (see NIKKEI ELECTRONICS, Oct. 15, 1990, No. 511, pp.124–129). On the other hand, a digital recording/reproducing apparatus is also being developed which records information signals on a recording medium in a highly efficient encoded form and decodes the high-efficiency encoded information signals read from the recording medium to thereby reproduce original information signals. In the digital recording apparatus, video cassette recorders (VCRs), using magnetic tapes as a recording medium, and IC (Integrated Circuit) memory devices), using semiconductor memories as a recording medium, have been developed.

At present a leading high-efficiency encoding technique uses an orthogonal transform technique which is referred to as a DCT (Discrete Cosine Transform) technique.

FIG. 1 illustrates a conventional recording apparatus utilizing such a DCT technique. In FIG. 1, a data input terminal 11 is supplied with a digital data such as digital image data as a valid transmission information signal. The digital image data is transmitted on a field-sequential basis in the NTSC system. Thus, two successive fields stored in frame memory 12 produce one frame of the digital image data. In this case, the digital image data is produced by encoding a luminance signal Y, a red signal component Cr and a blue signal component Cb. Unless otherwise specified, the luminance signal Y is taken as an example in the following description.

When one frame of the digital image data is sampled at, for example, a frequency of 4fsc (14.3 MHz), 910 pixels are present on one horizontal line, because there are 910 samples in the horizontal direction. There are 525 lines in the vertical direction and thus 525 pixels are present in the vertical direction. That is, there are a total of 910 × 525 pixels present at the time of sampling. However, only about 80% of the total number of pixels (768 pixels in the horizontal direction × 488 pixels in the vertical direction) can be visible on the screen as valid pixels. These valid pixels constitute digital image data applied to the input terminal as a valid transmission information signal. One frame of digital image data stored in the frame memory 12 is read in blocks of four pixels (horizontal) x four pixels (vertical) and applied to a DCT unit 13 where the digital data is subjected to an orthogonal transform process on a block-by-block basis.

The orthogonal transform converts the axis of digital image data from the time axis to the frequency axis on a block basis. The orthogonal transform also converts low frequency components into high frequency components in the order of increasing frequency, two-dimensionally, in both the horizontal and the vertical directions. Thus, the digital image data is arranged such that it changes from a direct current through a low frequency to a high frequency in a zigzag scanning fashion as indicated FIG. 2 by the arrow which advances in the horizontal and the vertical directions. The data subjected to the orthogonal transform is delayed by a frame delay unit 14 by one-frame period of time corresponding to a time calculated by an activity calculator 22 as described later and then applied to a scanning converter 15.

The scanning converter 15 scans data in every block in a zigzag manner, as indicated by the arrow in FIG. 2, on the basis of the contents in a standard scanning table 16 stored in a suitable memory. Furthermore it rearranges them one-dimensionally so that the DC (direct current) components to high frequency components can be output in sequence in the order of increasing frequency in the horizontal and the vertical directions. This is because, from the standpoint of reproduction of an original image, when the bit rate is decreased, sequential transmission of DC components to high frequency components in the order of increasing frequency can reproduce a visually good image at a lower bit rate and, hence, with higher efficiency, The data scanned and converted in such a manner has a generally larger data amount than the original digital image data. Thus, data compression is not achieved without modification. For this reason, a quantizer 17 is used for requantization.

The quantizer 17 reduces an amount of data from the scanning converter 15 by dividing the data by corresponding contents in a multiplied quantization table, i.e., the result of multiplication of the contents of a basic quantization table 18 stored in a Suitable memory and a suitable coefficient A, which will be described later, by a multiplier 19. The data requantized by the quantizer 17 is further applied to a variable length encoder 20 for high-efficient transmission encoding. The encoding technique, which is used most by the variable-length encoder 20 is the HUffman encoding or Run Length encoding, in which the number of successive "0"s and the number of digits other than "0" following the "0" in a requantized output are combined to allocate fewer bits in the order of decreasing probability of its occurrence. The number of bits is two at a minimum and several tens at a maximum. Thus, the data compression is performed on the digital image data. The data subjected to the data compression is provided for digital recording on a recording medium (not shown) through a data output terminal 21.

In order to compress data while maintaining picture quality, the requantizing process by the quantizer 17 is the most Important. The performance of the requantization depends on the calculation of coefficient A, by which the basic quantization table 18 is multiplied, according to the basic quantization table 18 and the input digital image data. The picture definition (a rate at which fine detail and high frequency components are contained in a picture) is used for the calculation. That is, the coefficient A is calculated by the activity calculator 22 using, as a measure of evaluation, a normal deviation or a quantity extracted from high frequency components output from the DCT unit 13. The result of this calculation is converted to the coefficient A by a coefficient converter 23, which is in turn applied to a multiplier 19.

At the time of reproducing of the high-efficiency encoded data from the recording medium, the variable-length encoded data is read from the recording medium and then subjected to processes which are the inverse of those at the time of the encoding of data, i.e., inverse quantization, inverse scanning conversion and inverse DCT processing. Thereby, the original digital image data is recovered and displayed as an picture.

Now the requantizing operation of the quantizer 17 will be described. Suppose that such a scanning table as shown in FIG. 3A is applied from the scanning converter 15 to the quantizer 17, while an operative quantization table, which is a multiplication of the basic quantization table as shown in FIG. 3B, stored the basic quantization table 18 with the coefficient "2" supplied from the coefficient converter 23. Then, the quantizer 17, which multiplies each of the values of the basic quantization table 18 by the coefficient "2" and divides a corresponding input value of the quantizer 17 by each of the multiplication results As shown in FIG. 3C, therefore, each output of the quantizer 17 is decreased in quantity of data. The data compressed as shown in FIG. 3C is subjected to the variable-length encoding process and then recoded on the first recording medium.

At the time of reproducing of the first recording medium, an expansion of data is performed by the inverse quantization processing by multiplying each input value of the basic quantization table 18 by the coefficient "2" used at the time of the compression and multiplying each value compressed as shown in FIG. 3C by a corresponding one of the multiplication results. In this case, as shown in FIG. 3D, the results of the inverse quantization the portions which are marked with * have values smaller than the corresponding original values shown in FIG. 3A. That is, data deterioration occurs in that portion. However, with the high-efficiency encoding process using the DCT technique, such a degree of data deterioration is inevitable memory because it is an irreversible encoding system and is not a problem to be solved by the present invention (at this time, a truncating process is used for the calculation, discarding the decimal fractions).

In consideration of the conventional recording apparatus having a copy prohibiting function, a microcomputer controls the recording apparatus to detect copy prohibiting information from the input digital data and to ignore any operation for recording keys so that circuits associated for the recording operation is deactivated. However, such a copy prohibiting operation has a problem to mislead an operator to misunderstand as if the recording apparatus were caught in any trouble, because of the deactivation of the recording operation.

SUMMARY OF THE INVENTION

It is, therefore, an object of the present invention to provide a recording apparatus which is easy to operate by an operator.

Another object of the present invention is to provide a recording apparatus which is securely able to prohibit a copying operation in response to a copy prohibiting information.

In order to achieve the above object, a recording apparatus according to the present invention includes an orthogonal transform unit for transforming the time axis of the digital data to the frequency axis on a block-by-block basis. A conversion circuit for converting the digital data from the orthogonal transform means to a digital recording data and a circuit for causing the conversion circuit to convert the digital data to a recording data which is substantially impossible to be restored to the original digital data.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 2 is a diagram showing a scanning operation used in the recording apparatus of FIG. 1;

FIGS. 3A through 3D are diagrams showing exemplary tables for processes of encoding and decoding operations carried out in the recording apparatus of FIG. 1;

FIGS. 5A and 5B are diagrams showing tables associated with the operation of the first embodiment;

FIGS. 6A and 6B are diagrams showing tables associated with the other operation of the first embodiment;

FIG. 8 is a diagram showing a table associated with the operation of the second embodiment;

FIGS. 10A and 10B are diagrams showing tables associated with the operation of the third embodiment

DESCRIPTION OF THE PREFERRED EMBODIMENTS

Figure 1:
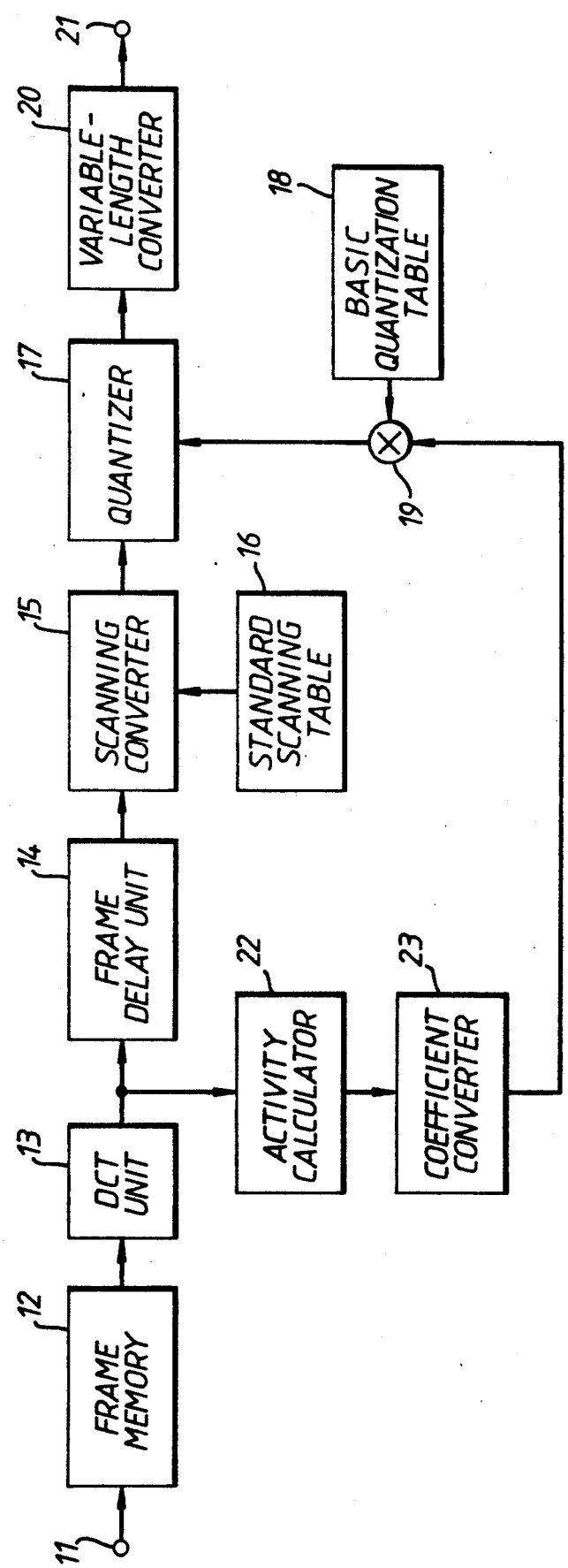
FIG. 1 is a block diagram showing a conventional recording apparatus.

The present invention will be described in detail with reference to the FIGS. 4 through 10B. Throughout the drawings, reference numerals or letters used in FIG. will be used to designate like or equivalent elements for simplicity of explanation.

Figure 4:
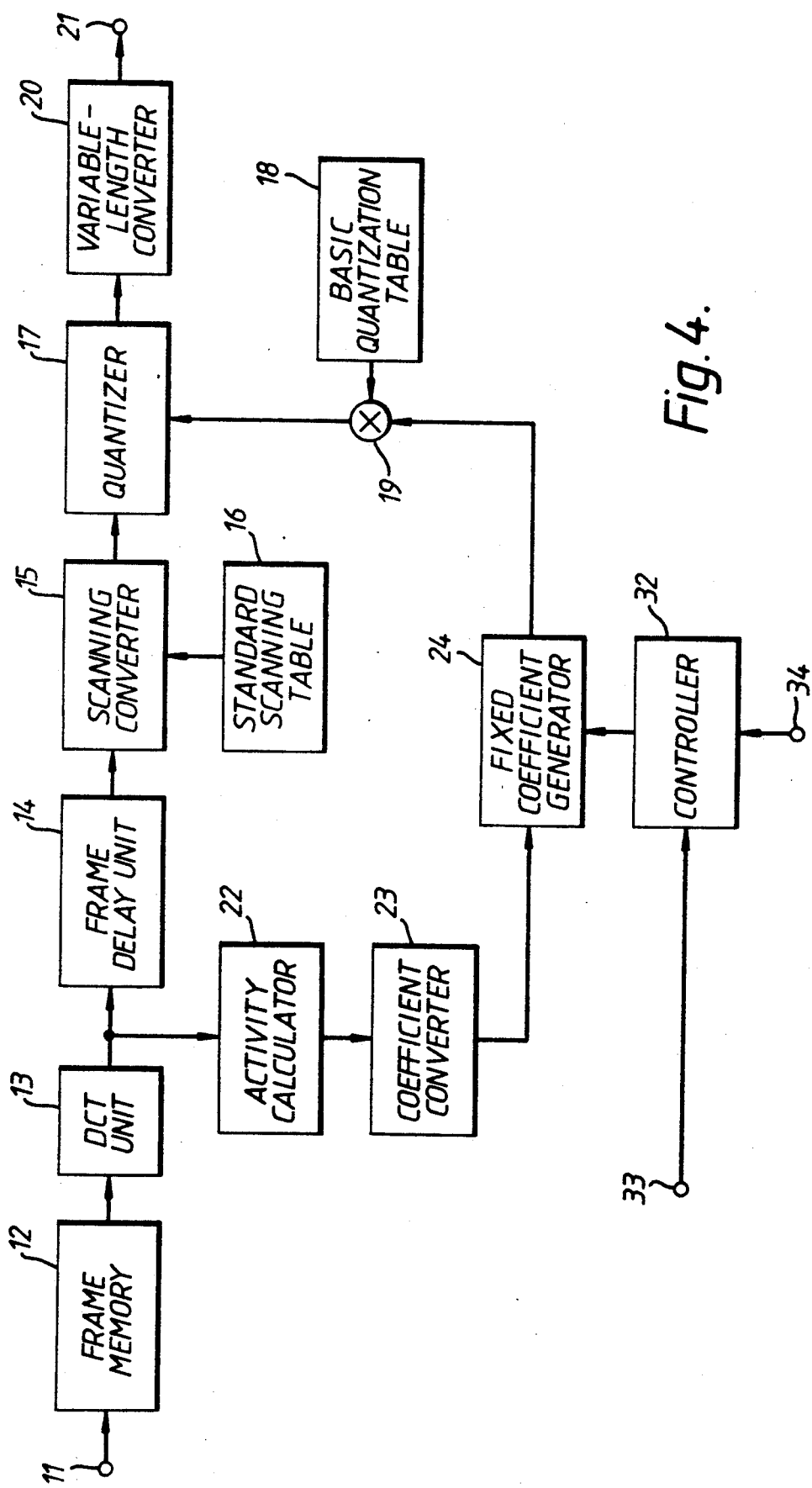
FIG. 4 is a block diagram showing a first embodiment of the recording apparatus according to the present invention.

Referring now to FIGS. 4, 5 and 6, a first embodiment of the recording apparatus according to the present invention will be described in detail.

FIG. 4 shows a block diagram of the first embodiment of the recording apparatus. In FIG. 4, the recording apparatus has a data input terminal 11, a frame memory 12, a DCT unit 13, a frame delay unit 14, a scanning converter 15, a standard scanning table 16 stored in a suitable memory, a quantizer 17, a basic quantization table 18, a multiplier 19, a variable-length encoder 20, a data output terminal 21, an activity calculator 22 and a coefficient converter 23, which is similar to the conventional recording apparatus as shown in FIG. 1. These elements are the same as those in the conventional recording apparatus, thus the explanations of FIG. 1 are used for reference. The first embodiment of the recording apparatus further includes a fixed coefficient generator 24 and a controller 32. The fixed coefficient generator 24 is coupled between the coefficient converter 23 and the multiplier 19. The controller 32 is couple to the fixed coefficient generator 24 for controlling the fixed coefficient generator 24 in response to a signal supplied through a first control input terminal 33 or a second control input terminal 34.

The coefficient A output from the coefficient converter 23 is applied to the multiplier 19 through the fixed coefficient generator 24. The fixed coefficient generator 24 generates a predetermined fixed coefficient B when activated by the controller 32. The controller 32 is supplied with copy prohibiting information through the first control input terminal 33, when the copy prohibiting information is included in the digital image data.

If the copy prohibiting information is not included in the digital image data, the copy prohibiting information is not applied to the controller 32 through the first control input terminal 33. In this case, the controller 32 fails to activate the fixed coefficient generator 24, so that the coefficient A output from the coefficient converter 23 is applied to the multiplier 19 without any interception by the fixed coefficient generator 24. Thus, the normal requantizing operation in the quantizer 17 is effected in the same manner as described for the conventional recording apparatus.

If the copy prohibiting information is included in the digital image data, the copy prohibiting information is applied to the controller 32 through the first control input terminal 33. In this case, the controller 32 activates the fixed coefficient generator 24, so that the coefficient A from the coefficient converter 23 is intercepted, while the fixed coefficient B generated in the controller 32 is applied to the multiplier 19 in place of the coefficient A.

If it is assumed that the fixed coefficient B has the value of "40", the quantization table, as shown in FIG. 5A, output from the multiplier 19 has table contents which are the result of multiplying the table contents of the basic quantization table (see FIG. 3B) stored in the basic quantization table 18 by "40" which is the fixed coefficient B in this example. The contents of the scanning table output from the scanning converter 15 (see FIG. 3A) are divided by corresponding contents of the quantization table, as shown in FIG. 5A, from the multiplier 19 in the quantizer 17. As a result, quantized data as shown in a quantized table shown in FIG. 5B are output from the quantizer 17. As seen from the quantized table of FIG. 5B, most of the contents are decreased to "0" so that they are abandoned. Thus, the digital image data applied to the recording apparatus is recorded in a recording medium, such as a magnetic tape, but the digital image data is recorded in the deteriorated configuration with the decreased table contents as shown in FIG. 5B. Thus, the recording of the digital image data is substantially prohibited when the copy prohibiting information is included in the digital image data.

The controller 32 may have another input terminal 34 for manually operating the controller 32. Accordingly, an operator is able to prohibit the valid recording operation of the recording apparatus by applying a suitable signal to the input terminal 34, if the copy prohibiting information is not included in the digital image data.

According to the first embodiment of the recording apparatus, the recording operation of the apparatus is normally carried out, if the copy prohibiting information is included in the digital image data. Thus, the operator may not be misled to misunderstand that the recording apparatus is caught in any trouble. Further, the first embodiment of the recording apparatus is securely able to prohibit the digital image data when the copy prohibiting information is included therein.

In the first embodiment of the recording apparatus, the deterioration of the quantized data output from the quantizer 17 for substantially prohibiting the recording operation is also effective by using a very small coefficient, e.g., "0.2", as the fixed coefficient B of the fixed coefficient generator 24. In the case of the "0.2", the contents of the modified quantization table are decreased as shown in FIG. 6A. As a result, the quantized data from the quantizer 17 are transformed to the values of the table as shown in FIG. 6B. As seen from the quantized table of FIG. 6B, most of the contents are increased to very large values. Thus, the digital image data applied to the recording apparatus is recorded in a recording medium, but the digital image data is applied in a deteriorated configuration with excessively increased table contents as shown in FIG. 6B. Then the quantized data output from the quantizer 17 has the excessive amount of data. As the transmission rate of the one frame is limited to a predetermined value, the recording apparatus fails to record four-fifths of the quantized data. Thus, the digital image data is substantially prohibited from recording, when the copy prohibiting information is included in the digital image data or the controller 32 is manually operated.

Figure 7:
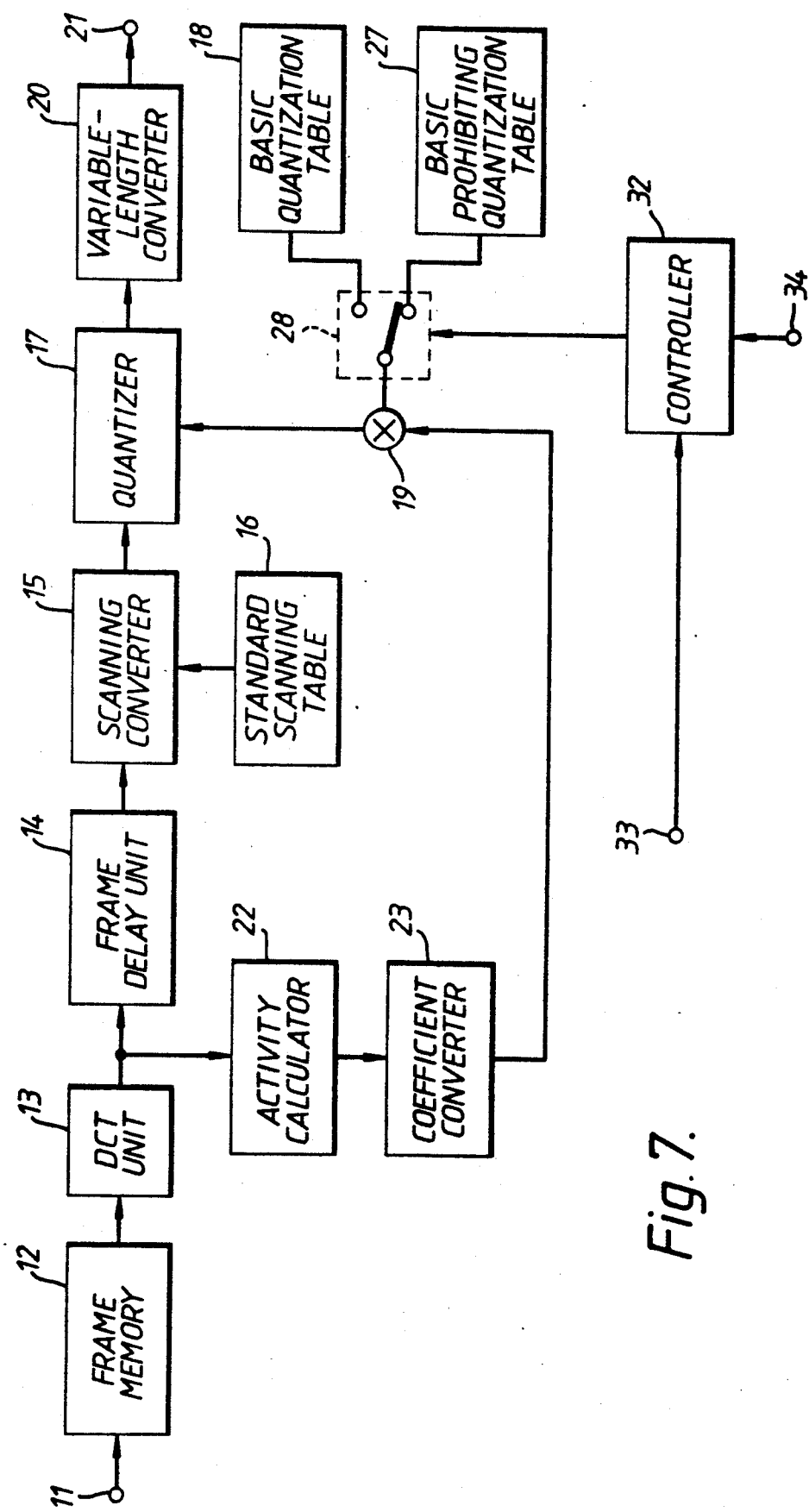
FIG. 7 is a block diagram showing a second embodiment of the recording apparatus according to the present invention.

Referring now to FIGS. 7 and 8, a second embodiment of the recording apparatus according to the present invention will be described.

FIG. 7 shows a block diagram of the second embodiment of the recording apparatus. In FIG. 7, the recording apparatus has a data input terminal 11, a frame memory 12, a DCT unit 13, a frame delay unit 14, a scanning converter 15, a standard scanning table 16, a quantizer 17, a basic quantization table 18, a multiplier 19, a variable-length encoder 20, a data output terminal 21, an activity calculator 22 and a coefficient converter 23, which is similar to the conventional recording apparatus as shown in FIG. 1. These elements are the same as those in the conventional recording apparatus, thus the explanations of FIG. 1 are used for reference. The second embodiment of the recording apparatus further includes a copy prohibiting quantization table 27 stored in a suitable memory and a controller 32. The copy prohibiting quantization table 27 and the basic quantization table 18 are selectively coupled to the multiplier 19 through a selector 28 which is controlled by the controller 32. The controller 32 operates the selector 28 in response to a signal supplied through a first control input terminal 33 or a second control input terminal 34. The controller 32 is supplied with copy prohibiting information through the first control input terminal 33, when the copy prohibiting information is included in the digital image data.

If the copy prohibiting information is not included in the digital image data, the copy prohibiting information is not applied to the controller 32 through the first control input terminal 33. In this case, the controller 32 controls the selector 28 to select the basic quantization table 18, so that the normal requantizing operation in the quantizer 17 is effected in the same manner as described for the conventional recording apparatus.

If the copy prohibiting information is included in the digital image data, the copy prohibiting information is applied to the controller 32 through the first control input terminal 38. In this case, the controller 32 controls the selector 28 to select the copy prohibiting quantization table 27. The copy prohibiting quantization table 27 stores a copy prohibiting quantization table as shown in FIG. 8. As seen from FIG. 8, the copy prohibiting table includes only one valid content which processes only the DC component of the digital image data. Thus, the digital image data applied to the recording apparatus is recorded in a recording medium such as a magnetic tape, but all the AC components are not recorded. In this case, each image block with 4 × 4 pixels is fixed to the same level so that a reproduced image on the display presents a mozaic picture. Thus, the recording operation of the recording apparatus is substantially prohibited when the copy prohibiting information is included in the digital image data.

The controller 32 may also have another input terminal 34 for manually operating the controller 32, which is similar to the first embodiment. Accordingly, an operator is able to prohibit the valid recording operation of the recording apparatus by applying a suitable signal to the input terminal 34, if the copy prohibiting information is not included in the digital image data.

According to the second embodiment of the recording apparatus, the operator may not be misled to misunderstand that the recording apparatus is caught in any trouble. Further, the first embodiment of the recording apparatus is securely able to prohibit the digital image data when the copy prohibiting information is included therein.

Figure 9:
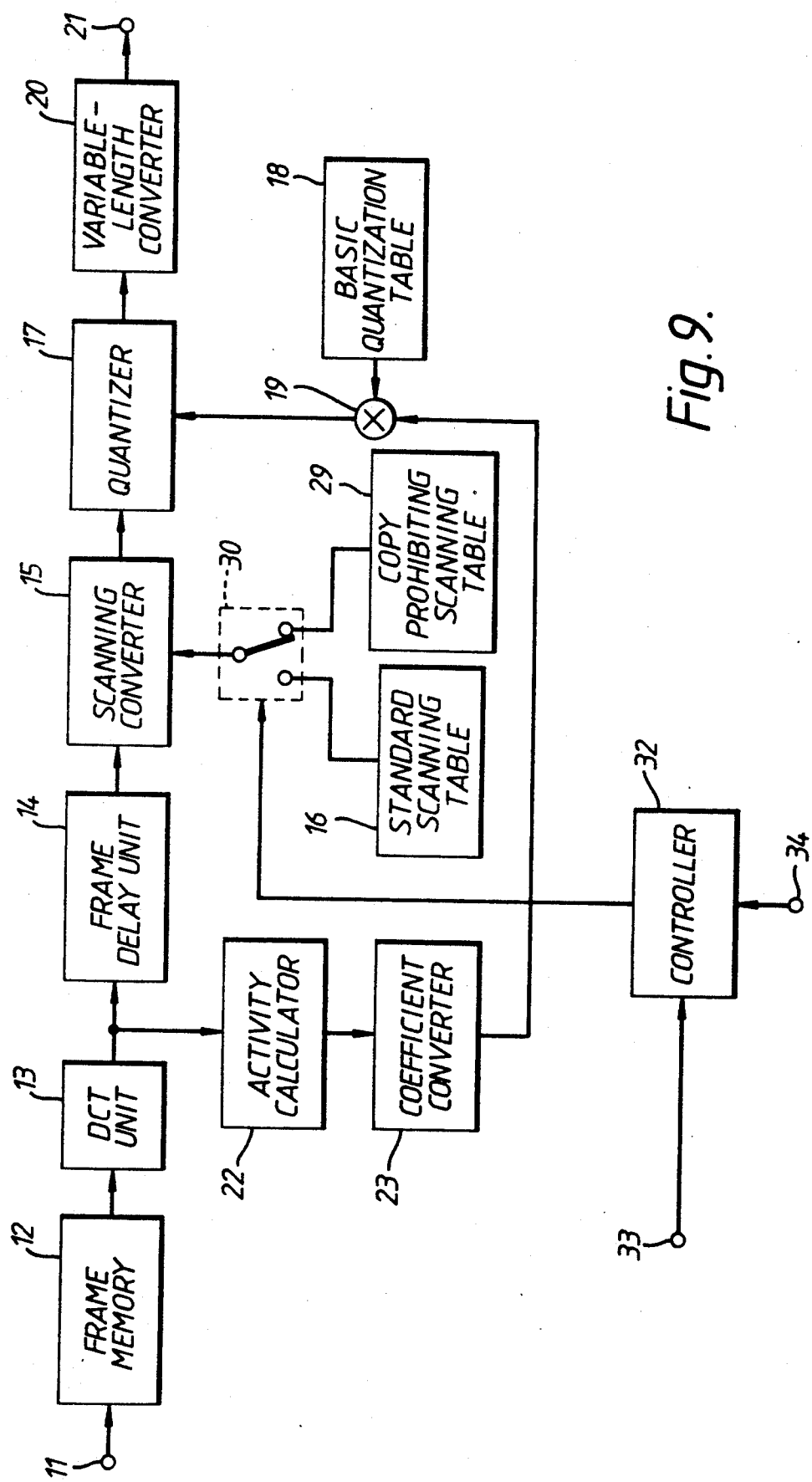
FIG. 9 is a block diagram showing a third embodiment of the recording apparatus according to the present invention.

Referring now to FIGS. 9, 10A and 10B, a third embodiment of the recording apparatus according to the present invention will be described.

FIG. 9 shows a block diagram of the third embodiment of the recording apparatus. In FIG. 9, the recording apparatus has a data input terminal 11, a frame memory 12, a DCT unit 13, a frame delay unit 14, a scanning converter 15, a standard scanning table 16, a quantizer 17, a basic quantization table 18, a multiplier 19, a variable-length encoder 20, a data output terminal 21, an activity calculator 22 and a coefficient converter 23, which is similar to the conventional recording apparatus as shown in FIG. 1. These elements are the same as those in the conventional recording apparatus, thus the explanations of FIG. 1 are used for reference. The third embodiment of the recording apparatus further includes a copy prohibiting scanning table 29 stored in a suitable memory and a controller 32. The copy prohibiting scanning table 29 and the standard scanning table 16 are selectively coupled to the scanning converter 15 through a selector 30 which is controlled by the controller 32. The controller 32 operates the selector 30 in response to a signal supplied through a first control input terminal 33 or a second control input terminal 34. The controller 32 is supplied with copy prohibiting information through the first control input terminal 33, when the copy prohibiting information is included in the digital image data.

Figures 2, 3A, 3B:
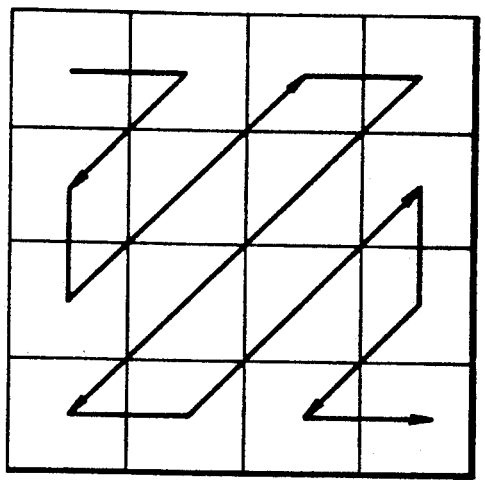

If the copy prohibiting information is not included in the digital image data, the controller 32 controls the selector 30 to select the standard scanning table 16. The standard scanning table 16 stores a standard scanning table as shown in FIG. 10A. The standard scanning table of FIG. 10A has contents indicating a normal sequence for carrying out the above-mentioned zigzag scanning as shown in FIG. 2. Thus the normal requantizing operation in the quantizer 17 is effected in the same manner as described for the conventional recording apparatus.

If the copy prohibiting information is included in the digital image data, the copy prohibiting information is applied to the controller 32 through the first control input terminal 33. In this case, the con&roller 32 controls the selector 30 to select the copy prohibiting scanning table 29. The copy prohibiting scanning table 29 stores a copy prohibiting scanning table as shown in FIG. 10B. As seen from FIG. 10B, the copy prohibiting scanning table has contents indicating a reverse sequence against the normal sequence provided by the standard scanning table of FIG. 10A, so that the recording apparatus carries out the scanning of the digital image data in the reverse sequence. In this case, the digital image data is recorded on the recording medium in the wrong sequence, so that the original image data is not reproduced from the recording medium. As a result, the recording operation of the recording apparatus is substantially prohibited when the copy prohibiting information is included in the digital image data.

The controller 32 may also have another input terminal 34 for manually operating the controller 32, in similar to the first embodiment. Accordingly, an operator is able to prohibit the valid recording operation of the recording apparatus by applying a suitable signal to the input terminal 34, if the copy prohibiting information is not included in the digital image data.

According to the third embodiment of the recording apparatus, operator may not be misled to the misunderstand that the recording apparatus is caught in any trouble. Further, the third embodiment of the recording apparatus is securely able to prohibit the digital image data when the copy prohibiting information is included therein.

As described above, the present invention can provide an extremely preferable recording apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A recording apparatus for recording digital data, comprising:
   means for orthogonally transforming a time axis of the digital data to a frequency axis on a block-by-block basis producing digital orthogonally transformed data;
   means for converting the digital orthogonally transformed data to digital recording data; and
   means for causing the converting means to convert the digital orthogonally transformed data to digital recording data which substantially cannot be restored to the original digital data.

2. A recording apparatus as claimed in claim 1, wherein the converting means includes:

means for scanning the digital orthogonally transformed data in a zigzag direction in each data block of the digital orthogonally transformed data producing scanned digital data, the scanning means being provided with a standard scanning table;

means for quantizing the scanned digital data, the quantizing means being provided with a basic quantization table for dividing the scanned digital data therewith; and means for providing a variable coefficient in response to an activity of the digital orthogonally transformed data for adaptively multiplying contents of the basic quantization table.

3. A recording apparatus as claimed in claim 2, wherein the causing means includes a fixed coefficient generator for applying a fixed coefficient to the providing means in place of the variable coefficient.

4. A recording apparatus as claimed in claim 3, wherein the fixed coefficient generator has means for generating an excessively large coefficient.

5. A recording apparatus as claimed in claim 3, wherein the fixed coefficient generator has means for generating an excessively small coefficient.

6. A recording apparatus as claimed in claim 2, wherein the causing means includes an additional quantization table alternative to the basic quantization table for causing the quantizing means to quantize the scanned digital data into digital data substantially corresponding to a DC signal.

7. A recording apparatus as claimed in claim 2, wherein the causing means includes an additional scanning table alternative to the standard scanning table for causing the scanning means to scan the digital orthogonally transformed data in a sequence other than the standard sequence.

8. A recording apparatus as claimed in claim 1, wherein the causing means has means which operates responsive to a predetermined information included int he digital data applied to the recording apparatus.

9. A recording apparatus as claimed in claim 1, wherein the causing means has a manually operable means.

* * * * *

UNITED STATES PATENT AND TRADEMARK OFFICE
CERTIFICATE OF CORRECTION

PATENT NO. : 5,216,712
DATED : June 01, 1993
INVENTOR(S) : Kenji Shimoda et al.

It is certified that error appears in the above-indentified patent and that said Letters Patent is hereby corrected as shown below:

Claim 8, column 10, line 18 and 19, change "int he" to --in the--.

Signed and Sealed this

Fifth Day of April, 1994

Attest:

BRUCE LEHMAN

*Attesting Officer*     *Commissioner of Patents and Trademarks*